United States Patent [19]

Decker

[11] 3,945,521

[45] Mar. 23, 1976

[54] ROTABLE TRAILER

[76] Inventor: Warren L. Decker, 228 N. Willow Ave., Centre Hall, Pa. 16828

[22] Filed: May 16, 1974

[21] Appl. No.: 470,610

[52] U.S. Cl. ............................. 214/506; 280/414 R
[51] Int. Cl.² ............................................. B60P 3/00
[58] Field of Search ........ 214/85, DIG. 5, 620, 506; 280/38, 414; 296/23 B

[56] References Cited
UNITED STATES PATENTS

| | | | |
|---|---|---|---|
| 2,544,113 | 3/1951 | Snead............................ | 214/85 UX |
| 2,628,733 | 2/1953 | Hale.............................. | 214/506 |
| 2,661,108 | 12/1953 | Horn et al...................... | 214/506 |
| 2,720,413 | 10/1955 | Halverson...................... | 296/23 B X |
| 3,025,985 | 3/1962 | Crawford....................... | 214/505 |
| 3,536,214 | 10/1970 | Sorg.............................. | 214/85 |
| 3,786,950 | 1/1974 | Zemien.......................... | 214/506 |

Primary Examiner—Kenneth H. Betts
Assistant Examiner—R. Schrecengost

[57] ABSTRACT

This invention is a unique vehicle towed trailer, useful in loading and unloading power driven equipment. The trailer has the features of a rotatable bed, means for tilting the bed, means for locking and clamping towing tongue to the trailer, means for removing to trailer from the lower frame, for use as a pallet, means to use the lower frame as a trailer and means to rotate the trailer bed to facilitate loading and unloading of power equipment.

6 Claims, 12 Drawing Figures

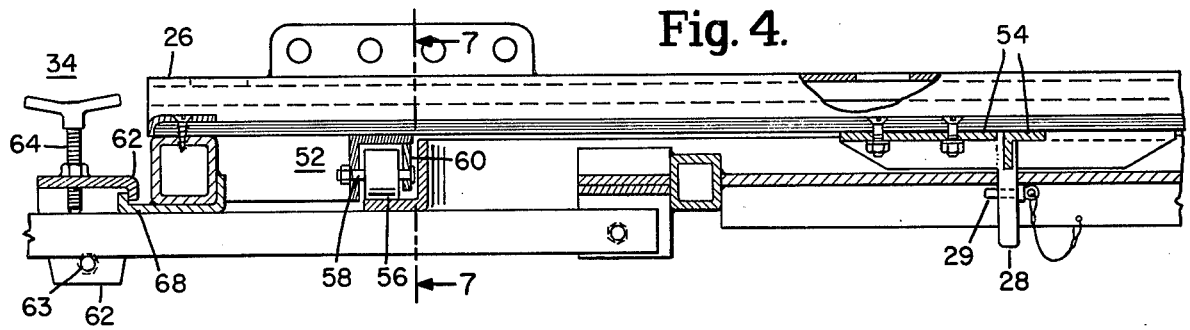
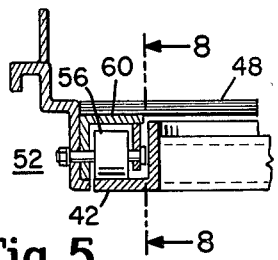
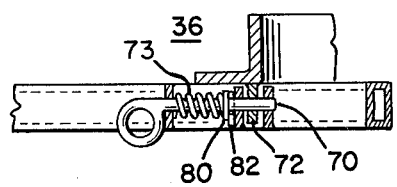
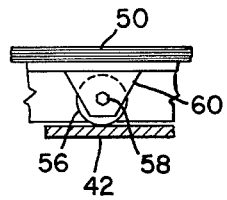
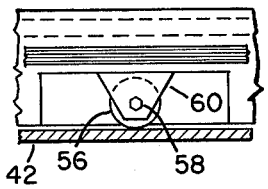
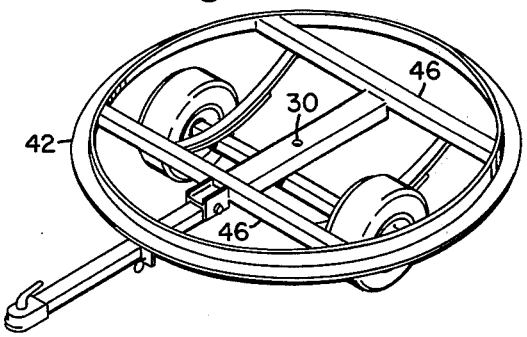
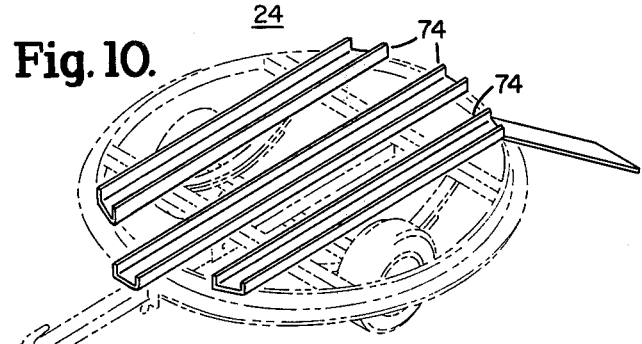
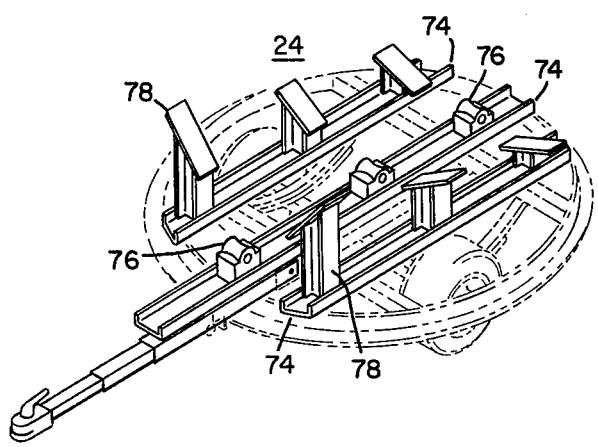
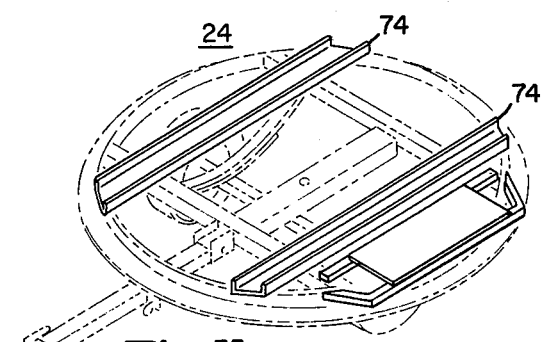

ROTABLE TRAILER

This invention relates to trailer means adapted to be towed by a vehicle and, more particularly to trailer means, the bed of which may be rotated in any direction.

The present invention is a new design trailer with a bed which will rotate 360°. In addition, the trailer bed also tilts.

These features are particularly desirable when loading and unloading power driven equipment, such as a snowmobile or lawn tractor. In such a case the snowmobile or tractor may be driven upon the tilted trailer and parked. When the snowmobile or tractor is to be removed from the trailer, the bed may be rotated 180° allowing the snowmobile or tractor to be driven forward and off the trailer.

In addition, the rotatable trailer bed may be easily removed and the lower part of the frame, connected to the wheels, may be utilized for a conventional motorcycle trailer, terrain vehicle trailer, or boat. Thus a fully convertible trailer is had by the use of this present invention.

Accordingly an object of this invention is to provide for a trailer means having a rotatable bed thereon.

Another object of this invention is to provide for a trailer means having a tilting mechanism thereon.

Still another object of this invention is to provide for a convertible trailer, the rotable bed of which may be removed allowing the lower portion to be adapted to conventional trailer means.

Yet another object of this invention is to provide a rotable trailer means which may be unloaded or loaded at various bed rotation angles.

It is yet another object of this invention to provide a spring loaded lock mechanism for securing a trailer means in an untilted position.

It is yet another object of this invention to provide a trailer rotating means comprised of a single circular rail member upon which is mounted a plurality of wheel members supporting a trailer bed.

These and other objects of the invention may be seen from the following discussion taken in conjunction with the accompanying drawings in which:

FIG. 4 is a cross sectional view of FIG. 3 along lines 4—4.

FIG. 5 is a cross-sectional view along lines 5—5 of FIG. 3.

FIG. 6 is a cross sectional view along lines 6—6 of FIG. 3.

FIG. 7 is a cross sectional view along lines 7—7 of FIG. 4.

FIG. 8 is a cross sectional view along lines 8—8 of FIG. 5.

FIG. 9 is a perspective view of the trailer means with the trailer bed removed.

FIG. 10 is a perspective view of the trailer means of FIG. 9 having rails thereon for the transportation of motorcycles.

FIG. 11 is a perspective view of the trailer means of FIG. 9 having rails thereon to carry an all-terrain vehicle.

FIG. 12 is a perspective view of the drawing of FIG. 9 having rails and support thereon for the carrying of a boat.

Figure 1:
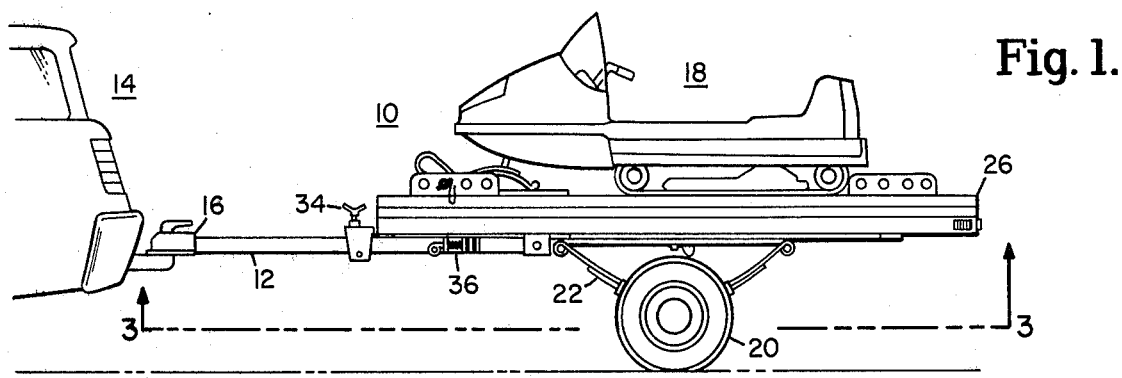
FIG. 1 is a side view of the trailer means of this invention attached to a towing vehicle, the trailer means having a skimobile load thereon.
Figure 2:
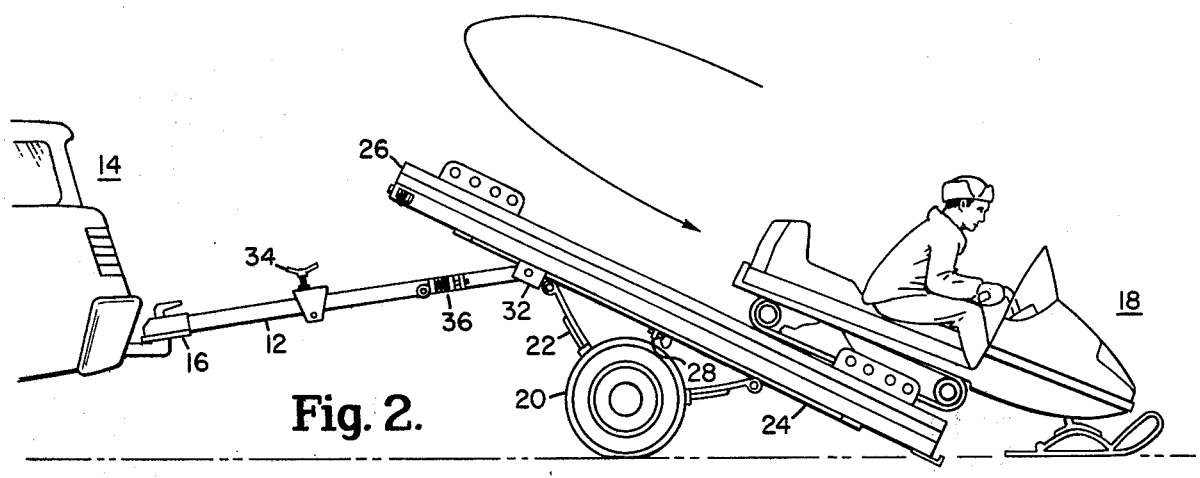
FIG. 2 is a side view of the invention in which the trailer means is tilted allowing the skimobile load to be driven off the trailer means in a forward direction.

Referring now to the drawings, and in particular to FIGS. 1 and 2, the trailer of this invention is generally represented by the numeral 10 and is coupled by means of tongue 12 to the rear end of a vehicle 14, by means of a conventional trailer hitch 16. Trailer 10 is generally shown with a snowmobile 18 resting thereon. Trailer 10 rests on the ground by means of wheels 20 which are coupled in a conventional manner to springs 22 connected to the trailer's lower frame 24. A trailer bed 26 rests upon the lower frame 24 and rotates about center pivot pin 28 which passes through centering hole 30 in the lower frame 24.

Tongue 12 is connected to lower frame 24 by means of hinge plate 32 which allows trailer 10 to tilt about the axis of wheels 20 as is seen in FIG. 2. When the trailer 10 is in the normal towing position, a screw clamp 34 clamps the trailer bed 26 to tongue 12, thus preventing any motion of the trailer bed 26. A locking means 36 is attached to tongue 12 and engages trailer bed 26 rigidly locking it in the towing position.

As may be seen by FIGS. 1 and 2 the skimobile 18 may be driven upon the trailer bed 26 while the trailer is in the tilted position of FIG. 2. When it is desired to remove the skimobile, or snowmobile, the trailer bed may be rotated 180°, the trailer 10 tilted and the snowmobile 18 driven off in a manner indicated in FIG. 2.

Figure 3:
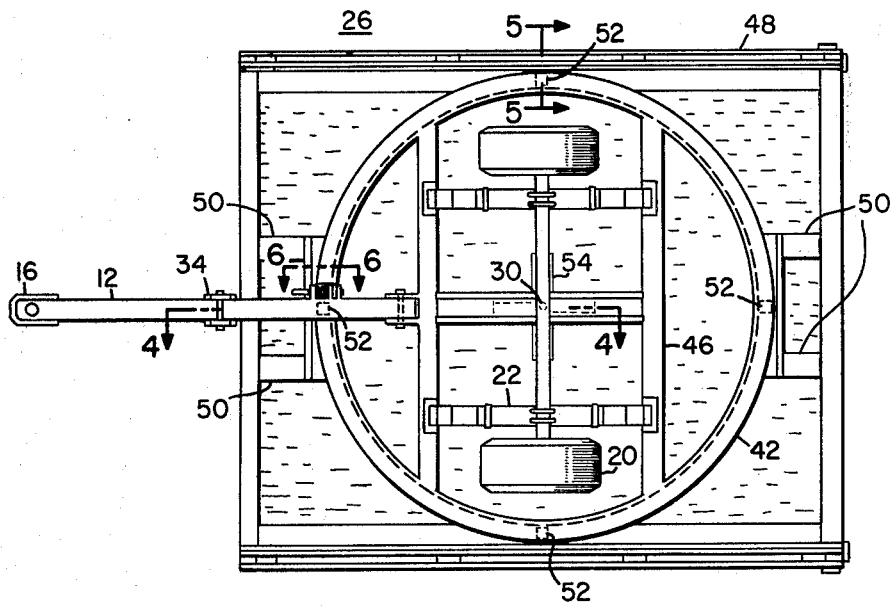
FIG. 3 is a bottom view of the trailer means along lines 3—3 of FIG. 1.

Referring now to FIG. 3 and FIG. 9 the lower frame 24 is comprised of a circular turntable 42 having an outwardly disposed L-shaped cross section 44. Parallel cross members 46 are integrally attached to turntable 42 perpendicular to tongue 12 to which they are welded. Springs 22 are likewise bolted to cross members 46 in the conventional manner.

Trailer bed 26 (FIG. 3) is genereally comprised of a rectangular metal frame 48 having support struts 50 extending from frame 48 to turntable 42. Rollers 52 are attached to the center portion of the support struts 50 as well as to the center portion of frame 48, (see FIG. 5). These rollers rest upon and are engaged by the circular turntable 42 in such a manner that the trailer bed 26 may be rotated about the turntable 42. Center pivot pin 28 (FIG. 4) extends outwardly and downward from the center portion of trailer bed 26 and is inserted in centering hole 30 of tongue 12. Center pivot pin 28 is attached to trailer bed 26 by means of support plate 54 which is bolted to the trailer bed 26. A removable lock pin 29 extends through center pivot pin 28 locking pin 28 in position.

Referring now to FIGS. 4, 5 and 7, rollers 52 are generally comprised of a roller wheel 56 having an axle 58 which extends through U-bracket 60. U-bracket 60 is integrally attached to support struts 50 and frame 48, permitting the roller wheels to turn upon turntable 42. It is within the scope of this invention to have a plurality of rollers 52 engaging turntable 42 as well as the four rollers herein shown and described.

Screw clamp 34 (FIG. 4) generally consists of clamp frame 62 secured about tongue 12 by means of bolt 63 extending through frame 62. A hand screw 64 screwably attached to clamp frame 62 may be hand turned forcing clamped frame 62 against bed protrusion 68 which is integrally attached to trailer bed 26. As may be seen from FIG. 4, as well as FIGS. 1 and 2, handscrew 64 contacts and bears against the upper surface of tongue 12 slightly the left of bolt 63, or on the opposite side of bolt 63 from that occupied by bed protrusion 68. When handscrew 64 bears against tongue 12, it causes clamp frame 62 to pivot about bolt 63, forcing clamp frame 62 against the bed protrusion 68 locking them together. Bolt 63 is thus acting as the fulcrum of a first class lever (similar to a see-saw) whereas handscrew 64 and clamp frame 62, adjacent to handscrew 68, acts as the end portions of the lever. As may be seen, trailer bed 26 is then effectively locked to tongue 12. As may be seen when hand screw 64 is advanced, the clamp frame 62 will pivot and press clamp frame 62 against protrusion 68 thus securing the trailer bed 26 in stationary position.

Locking means 36 (FIG. 6) attached to the side portion of tongue 12 is generally comprised of a spring loaded pin 70 which extends through pin member 72 which is attached to trailer turntable 42. Helical spring 73 is positioned around pin member 70. When the trailer 10 is in the driving position, spring loaded pin 70 will thus secure the trailer bed immobilly upon the trailer's lower frame 24. A washer 80 is positioned on pin 70, adajcent to spring 73, and is secured in position by cotter pin 82 which passes through pin 70. Thus when pin 70 is withdrawn spring 73 is compressed. Pulling of the spring loaded pin 70 out of the pin member 72 will likewise release the trailer bed 26, allowing it to tilt.

In operation, the trailer bed 26 may be rotated about center pivot pin 28 in any direction. During rotation, the rollers 52 bear against the circular turntable 42 supporting the trailer bed on the lower frame 24. In addition, by releasing screw clamp 34 and locking means 36 the trailer 10 may be allowed to tilt in a manner indicated by FIG. 2, permitting a self-propelled vehicle to be driven thereon and secured. Unloading of the self-propelled vehicle may be easily accomplished by rotating trailer bed 180° tilting the trailer and driving the self-propelled vehicle off the trailer 10. In addition, trailer 10 may be utilized with any type of load, allowing loading and unloading to take place at any convenient angle which trailer bed 26 may be rotated.

Furthermore trailer bed 26 may be lifted and removed from the trailer's lower frame 24 with or without the load attached thereto. When a load is attached to the trailer bed 26, it may be lifted as a pallet, as by a fork lift truck (not shown), and stacked with the attached load. The trailer bed, acting as a pallet may then be lifted back upon the trailer, the center pivot pin 28 secured and the trailer driven away in normal manner.

Referring now to FIG. 10, there is seen the lower frame 24 of trailer 10 having tracks 74 secured to the upper portion thereof. Such tracks may be used to engage the wheels of a motorcycle or bicycle for the transportation thereof. Likewise FIG. 11 indicates the trailer frame 24 having two tracks 74 adapted to receive the wheels of an all-terrain vehicle for transportation.

Referring now to FIG. 12, the lower frame 24 of trailer 10 is shown with tracks 74 mounted thereon upon which are boat rollers 76 mounted in the center portion. Boat supports 78 are mounted on the outer tracks 74 so as to engage the hull of a boat when it is positioned upon the lower frame 24.

In operation, a motorcycle or all-terrain vehicle may be driven or placed upon the trailer frame in a manner indicated in FIGS. 10 and 11 and secured thereto for transportation. Likewise a boat may be rolled upon boat rollers 76 of FIG. 12, supported by boat support 78. After the boat is secured it may be transported in the usual manner by the lower frame 24.

As may be seen a great degree of versatility is had by the use of this invention in the transportation of various objects.

I claim:

1. A trailer apparatus adapted to be attached to a towing vehicle having a rotatable and removable bed thereon, comprising in combination:
   a wheel supported lower frame having coupling means to be attached to a towing vehicle;
   a trailer bed positioned upon said lower frame;
   a circular turntable integrally attached to said lower frame;
   a plurality of wheels rotably attached to said trailer bed and adapted to engage said turntable;
   a center pivot pin integrally attached to the center portion of said bed and adapted to fit into a center hole located in said lower frame;
   a hinge plate positioned upon said lower frame;
   a tongue attached to said trailing vehicle;
   a pin extending through said hinge plate and through said tongue;
   a clamp frame rotably attached to said frame;
   screw means attached to press said clamp frame against said tongue whereby said clamp frame is pivoted;
   a spring loaded pin attached to sid tongue;
   a bed protrusion attached to said bed having an opening therethrough for the insertion of said spring loaded pin means.

2. The combination as claimed in claim 1, in which said trailer bed is removably attached from said lower frame including
   means releasably securing said center pivot pin to permit removal of said trailer bed from said lower frame.

3. The combination as claimed in claim 1, in which said plurality of wheels is comprised of four, comprising in combination:
   a U-shaped box member;
   an axle extending through said U-shaped box member;
   a roller wheel mounted upon said axle.

4. The combination as claimed in claim 3, in which said centering pivot pin has an opening therethrough;
   a locking pin adapted to extend through said opening securing said center pivot pin and said trailer bed to said lower frame.

5. A trailer apparatus adapted to be attached to a towing vehicle having a rotatable and removable bed thereon, comprising in combination:
   a wheel supported lower frame having coupling means to be attached to a towing vehicle;
   a trailer bed positioned on said lower frame;
   a circular turntable integrally attached to said lower frame;
   a plurality of wheels rotably attached to said trailer bed and adapted to engage said turntable;
   a center pivot pin integrally attached to the center portion of said bed and adapted to fit into a center hole located in said lower frame;
   a hinge plate positioned upon said lower frame;

a tongue attached to said trailing vehicle;
a pin extending through said hinge means and through said tongue;
a clamp frame rotably attached to said frame;
screw means attached to press said clamp frame against said tongue means, whereby said clamp frame is pivoted;
a spring loaded pin attached to said tongue means;
a bed protrusion attached to said bed having an opening therethrough for the insertion of said spring loaded pin means;
a U-shaped box member;
an axle member extending from said U-shaped box member;
a roller wheel mounted upon said axle;
said centering pivot pin with an opening therethrough;
a locking pin adapted to extend said pin securing said pivot pin to said trailer bed to said lower frame.

6. The combination as claimed in claim 5,:
wherein said lower frame, upon removal of said rotable bed, is adapted to removably support tracks with detachable boat rollers and boat supports thereon;
whereby a boat may be rolled upon said lower frame supported by said boat supports.

* * * * *